United States Patent
Lo

[19]

[11] Patent Number: 6,000,923
[45] Date of Patent: Dec. 14, 1999

[54] MOLD ASSEMBLY FOR MANUFACTURING AN OUTSOLE

[76] Inventor: Chie-Fang Lo, No. 11, Alley 7, Lane 715, Dong Ping Road, Tia Ping, Hsiang, Taiwan

[21] Appl. No.: 09/042,832

[22] Filed: Mar. 17, 1998

[51] Int. Cl.[6] .......................... B29C 33/26; B29C 45/16; B29D 31/50
[52] U.S. Cl. .......................... 425/112; 249/172; 264/245; 425/120; 425/129.2; 425/130; 425/183; 425/588
[58] Field of Search .............................. 425/129.2, 183, 425/119, 112, 120, 130, 588; 249/102, 155, 172; 264/244, 245

[56] References Cited

U.S. PATENT DOCUMENTS

| | | | |
|---|---|---|---|
| 2,652,592 | 9/1953 | Williams | 264/245 |
| 3,372,415 | 3/1968 | King | 425/119 |
| 3,463,849 | 8/1969 | Winkler | 425/119 |
| 3,500,502 | 3/1970 | Santelmann | 425/129.2 |
| 3,709,973 | 1/1973 | Maltby | 425/119 |
| 4,123,493 | 10/1978 | Schilke et al. | 425/129.2 |
| 4,276,254 | 6/1981 | Combronde | 264/244 |
| 4,778,368 | 10/1988 | Rebers et al. | 425/183 |
| 5,352,105 | 10/1994 | Yang | 425/129.2 |

FOREIGN PATENT DOCUMENTS

| | | | |
|---|---|---|---|
| 407688 | 1/1991 | European Pat. Off. | 264/244 |
| 2512132 | 9/1976 | Germany | 425/119 |
| WO 90/10528 | 9/1990 | WIPO | 264/244 |

*Primary Examiner*—Robert Davis
*Attorney, Agent, or Firm*—Rosenberg, Klein & Bilker

[57] ABSTRACT

A mold assembly for manufacturing an outsole includes a female mold, a first male mold pivotally connected to a side of the male mold and a second male mold pivotally connected to an end of the male mold. A peripheral wall defining the cavity has a separating flange extending inwardly therefrom. Each of the first male mold and the second male mole has at least one protrusion extending therefrom through which at least one passage is defined. The protrusion of the first male mold is inserted into the cavity and an outer surface of the protrusion abuts the separating flange. The first protrusion and the second protrusion are inserted into the cavity in sequence and material is injected into the cavity via the passages.

7 Claims, 3 Drawing Sheets

MOLD ASSEMBLY FOR MANUFACTURING AN OUTSOLE

BACKGROUND OF THE INVENTION

1. Field of the Invention

The present invention relates to a mold assembly and, more particularly, to an improved mold assembly for manufacturing an outsole with at least three colors formed in the outsole.

2. Brief Description of the Prior Art

Current outsoles for footwear are developed to have two colors so as to meet requirements of the market. Manufacturers use a female mold and a male mold to manufacture the outsole which can has only two colors. If extra colors are required, a spray painting is used to add the extra colors on the outsole. Nevertheless, the colors painted on the outsole easily peel. Some manufacturers receive melted rubber materials in molds so as to form an outsole. However, such outsole has a limited resilience and cannot be reused. Furthermore, the materials are hardened after heated or melted so that they are not good enough to be used as an outsole.

The present invention provides an improved mold assembly having a female mold and at least two male molds which are pivotally connected to the female mold so that an outsole is formed by way of injection molded. The two male molds are matched with the female molds in sequence and materials having different colors are injected into the space defined between the male mold and the two female molds so as to easily form the outsole.

SUMMARY OF THE INVENTION

In one aspect of the present invention, there is provided a mold assembly comprising a female mold having a cavity defined in an upper surface thereof and a peripheral wall defining the cavity having a separating flange extending inwardly and transversely therefrom. A first engaging member is fixedly disposed to a first side of the female mold and a second engaging member is fixedly disposed to a first end of the female mold.

At least one first male mold is pivotally connected to a second side of the female mold and has a first protrusion extending from an upper surface thereof. At least one first passage is defined through the first male mold and the first protrusion. A first connector is fixedly disposed to the first male mold so as to be engaged with the first engaging member when the first protrusion is received in the cavity.

At least one second male mold is pivotally connected to a second end of the female mold and has a second protrusion extending from an upper surface thereof. At least one second passage is defined through the second male mold and the second protrusion. A second connector is fixedly disposed to the second male mold so as to be engaged with the second engaging member when the second protrusion is received in the cavity.

It is an object of the present invention to provide a mold assembly having a female mold and two male molds which are inserted into the female mold in sequence.

It is another object of the present invention to provide a mold assembly wherein the first male mold is larger than that of the second male mold.

It is a further object of the present invention to provide a mold assembly wherein the female mold has a cavity defined by a peripheral wall from which a separating flange extends inwardly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
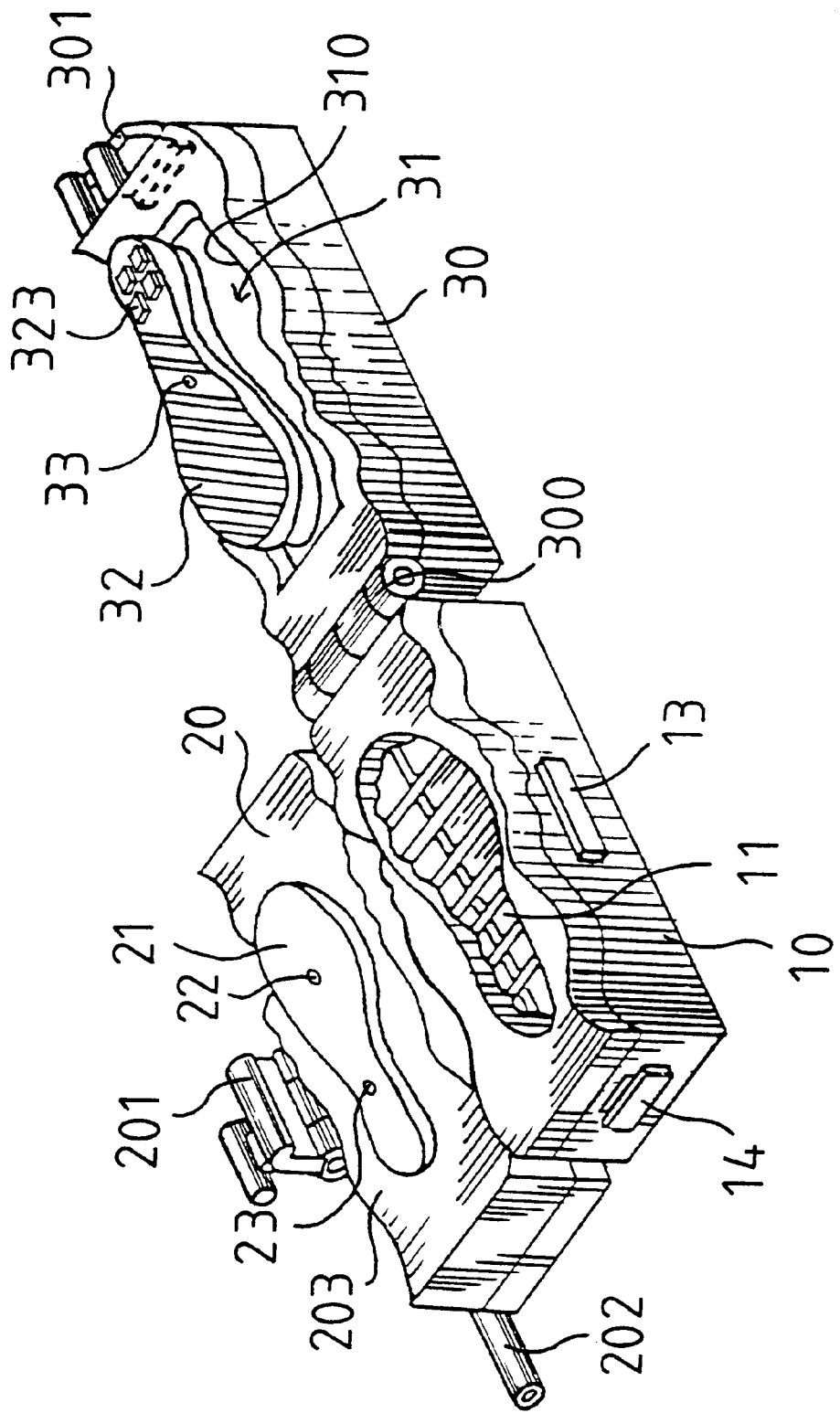
FIG. 1 is a perspective view of a mold assembly in accordance with the present invention.
Figure 2:
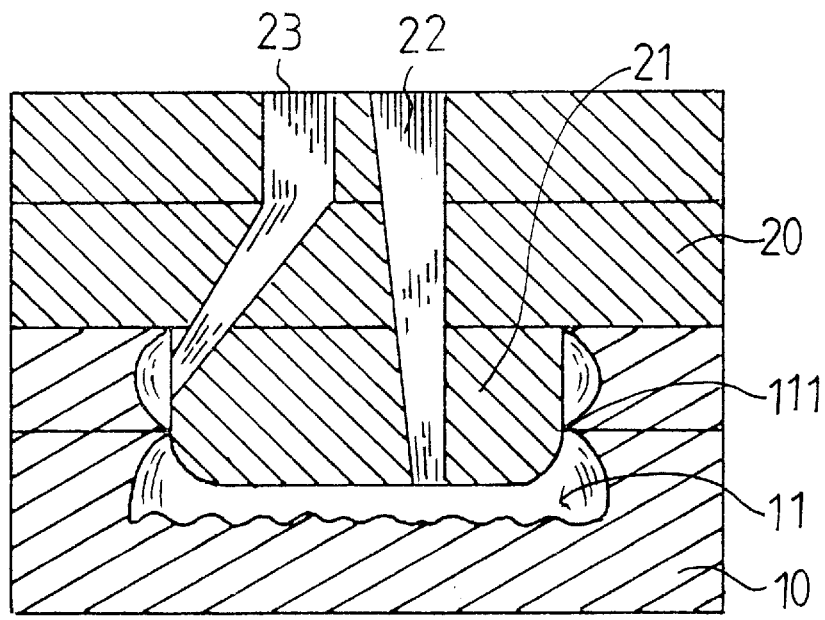
FIG. 2 is an illustrative view to show when the first male mold is matched with the female mold.

Referring to the drawings and initially to FIG. 1, a mold assembly in accordance with the present invention generally includes a female mold 10 having a cavity 11 defined in an upper surface thereof and a peripheral wall defining the cavity having a separating flange 111 extending inwardly and transversely therefrom, as shown in FIG. 2. A first engaging member 13 is fixedly disposed to a first side of the female mold 10 and a second engaging member 14 is fixedly disposed to a first end of the female mold 10.

Referring to FIG. 2, a first male mold 20 is pivotally connected to a second side of the female mold 10 and has a first protrusion 21 extending from an upper surface thereof. A first passage 22 and a second passage 23 are respectively defined through the first male mold 20 and the first protrusion 21. The first passage 22 communicates with an upper surface of the first protrusion 21 as shown in FIG. 1. The second passage 23 communicated with a peripheral surface of the first protrusion 21. A first connector 201 is fixedly disposed to the first male mold 20 so as to be engaged with the first engaging member 13 when the first protrusion 21 is received in the cavity 11. A handle 202 is connected to the first male mold 20 so as to facilitate a pivoting movement of the first male mold 20.

Figure 3:
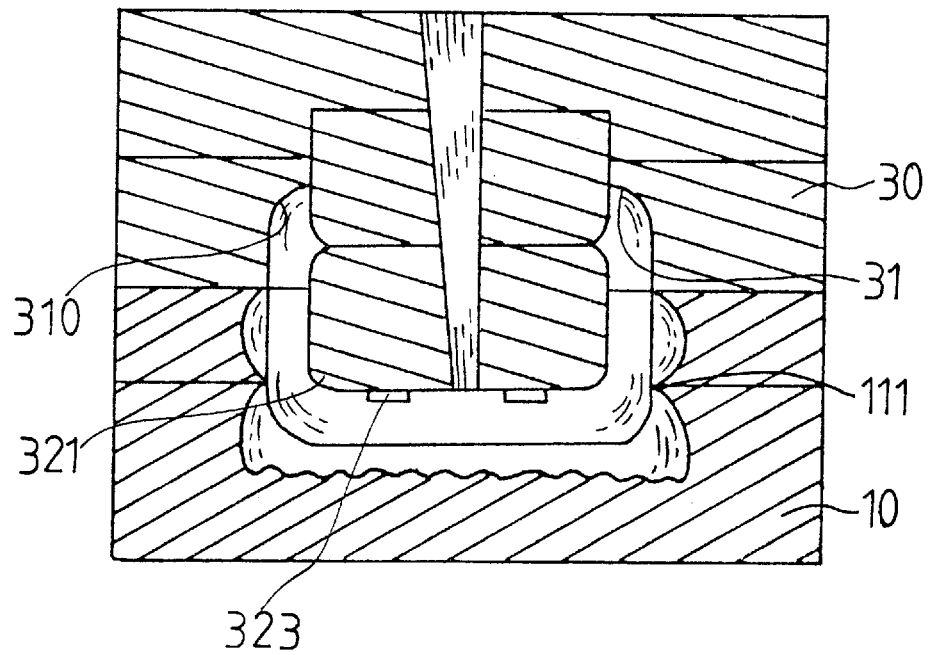
FIG. 3 is an illustrative view to show when the second male mold is matched with the female mold.

Referring to FIG. 3, a second male mold 30 is pivotally connected to a second end of the female mold 10 by a hinge means 300 and has a recess 31 defined therein. A second protrusion 32 extends from a bottom defining the recess 31 which is also defined by a serrated inner peripheral wall 310. The second protrusion 32 includes a first part 321 and a second part 322, wherein the first part 321 has four boss members 323 extending therefrom. At least one third passage 33 is defined through the second male mold 30 and the second protrusion 32. A second connector 301 is fixedly disposed to the second male mold 30 so as to be engaged with the second engaging member 14 when the second protrusion 32 is received in the cavity 11.

Referring to FIG. 2, when the first protrusion 21 is inserted into the cavity 11 the first protrusion 21 has its outer surface abutting and being enclosed by the separating flange 111. A first material and a second material are respectively injected into the first passage 22 and the second passage 23 so as to fill an upper space defined between the first protrusion 21 and the peripheral wall defining the cavity 11, and a lower space defined between the first protrusion 21 and the peripheral wall defining the cavity 11. The upper space is located above the separating flange 111 and the lower space is located below the separating flange 111. Therefore, the two spaces are filled with different color and characteristics material.

Figure 4:
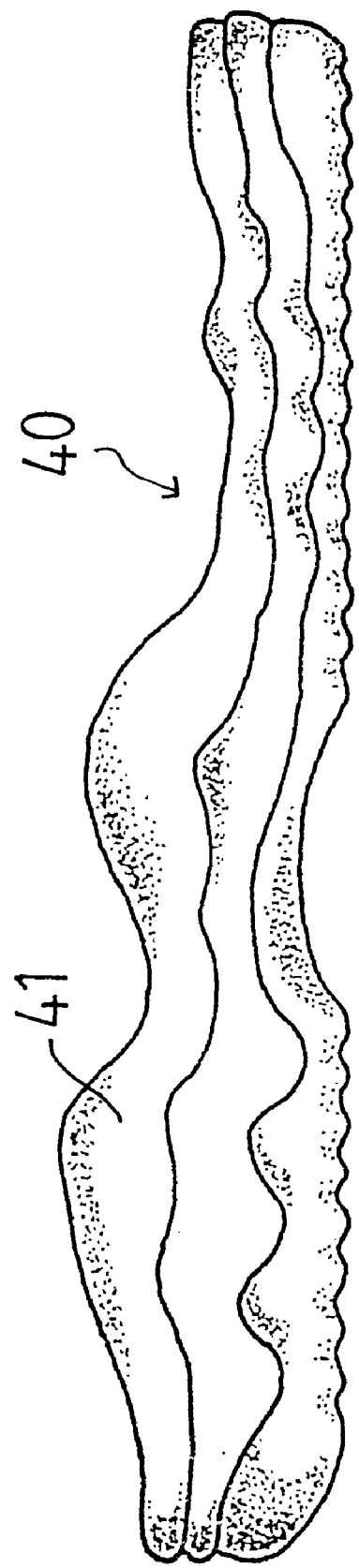
FIG. 4 is a side elevational view to show an outsole manufactured by the mold assembly of the present invention.

When the first male mold 20 is removed from the female mold 10, the second male mold 30 is pivoted to match with the female mold 10 as shown in FIG. 3. Because the first protrusion 21 is larger in size than that of the second protrusion 32 so that when the second protrusion 32 is inserted into the cavity 11, a space is defined between the second protrusion 32 and the separating flange 111. A material is then injected into the remained space between the second protrusion 32 and the two formed materials previously injected into the cavity. The recess 31 is filled with the material so as to form a sidewall 41 of an outsole 40 manufactured by the mold assembly, as shown in FIG. 4. The boss members 321 form four dents is an inner bottom of the outsole 40.

The mold assembly provides a easy means to manufacture an outsole having different colors and characteristics of materials. Although the invention has been explained in relation to its preferred embodiment, it is to be understood that many other possible modifications and variations can be made without departing from the spirit and scope of the invention as hereinafter claimed.

What is claimed is:

1. A mold assembly comprising:

a female mold having a cavity defined in an upper surface thereof and a peripheral wall defining said cavity having a separating flange extending inwardly and transversely therefrom, a first engaging member fixedly disposed to a first side of said female mold and a second engaging member fixedly disposed to a first end of said female mold;

at least one first male mold pivotally connected to a second side of said female mold and having a first protrusion extend from an upper surface thereof, at least one first passage defined through said first male mold and said first protrusion, a first connector fixedly disposed to said first male mold so as to be engaged with said first engaging member when said first protrusion is received in said cavity, and at least one second male mold pivotally connected to a second end of said female mold and having a second protrusion extending from an upper surface thereof, at least one second passage defined through said second male mold and said second protrusion, a second connector fixedly disposed to said second male mold so as to be engaged with said second engaging member when said second protrusion is received in said cavity.

2. The mold assembly as claimed in claim 1 wherein said first protrusion has its outer surface abutting and being enclosed by said separating flange when said first protrusion is inserted in said cavity.

3. The mold assembly as claimed in claim 1 wherein said first passage communicates with a space defined between said first protrusion and said peripheral wall defining said cavity and is located below said separating flange.

4. The mold assembly as claimed in claim 2 further comprising a third passage defined through said first male mold and said first protrusion, said third passage communicating with a space defined between said first protrusion and said peripheral wall defining said cavity and being located above said separating flange.

5. The mold assembly as claimed in claim 1 wherein said first protrusion is larger in size than that of said second protrusion so that when said second protrusion is inserted into said cavity, a space is defined between said second protrusion and said separating flange.

6. The mold assembly as claimed in claim 1 wherein said second male mold has a recess defined therein and said second protrusion extends from a bottom defining said recess.

7. The mold assembly as claimed in claim 6 wherein said recess is defined by a serrated inner peripheral wall.

* * * * *